US009327766B2

(12) United States Patent
Long et al.

(10) Patent No.: US 9,327,766 B2
(45) Date of Patent: May 3, 2016

(54) SLIDER PIN ASSEMBLY WITH INTEGRAL INBOARD AND OUTBOARD STOP

(71) Applicants: Thomas J. Long, Canton, OH (US); John J. Ramsey, Canton, OH (US)

(72) Inventors: Thomas J. Long, Canton, OH (US); John J. Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 292 days.

(21) Appl. No.: 13/760,695

(22) Filed: Feb. 6, 2013

(65) Prior Publication Data

US 2013/0202345 A1     Aug. 8, 2013

Related U.S. Application Data

(60) Provisional application No. 61/595,721, filed on Feb. 7, 2012.

(51) Int. Cl.
    *F16B 21/00*     (2006.01)
    *B62D 21/14*     (2006.01)
    *B62D 53/06*     (2006.01)

(52) U.S. Cl.
    CPC ............. *B62D 21/14* (2013.01); *B62D 53/068* (2013.01); *Y10T 403/32467* (2015.01); *Y10T 403/602* (2015.01); *Y10T 403/7037* (2015.01)

(58) Field of Classification Search
    CPC ... F16B 19/109; F16B 21/065; B62D 53/068; B62D 53/0814; B62D 21/14
    USPC ............ 403/262, 327, 360; 280/149.2, 407.1; 180/209
    See application file for complete search history.

(56) References Cited

U.S. PATENT DOCUMENTS

| 2,860,891 | A  | * | 11/1958 | Ramun | 280/407 |
|-----------|----|----|---------|-------|---------|
| 3,096,993 | A  | * | 7/1963  | McKay | 280/81.1 |
| 4,641,846 | A  |    | 2/1987  | Ehrhart | |
| 4,838,578 | A  | * | 6/1989  | Baxter | 280/149.2 |
| 5,564,727 | A  | * | 10/1996 | Wessels | 280/407.1 |
| 5,642,896 | A  |    | 7/1997  | Pierce et al. | |
| 6,213,489 | B1 | * | 4/2001  | Eckelberry | 280/407.1 |
| 7,503,414 | B2 | * | 3/2009  | Pierce et al. | 180/209 |
| 7,604,248 | B2 |    | 10/2009 | Bromley et al. | |
| 7,806,381 | B2 | * | 10/2010 | Sisk Horne et al. | 248/354.5 |
| 8,272,654 | B2 | * | 9/2012  | Xie | 280/149.2 |
| 8,485,751 | B2 | * | 7/2013  | Vetesnik | 403/109.3 |
| 2001/0013693 | A1 |   | 8/2001  | Ross et al. | |
| 2006/0267306 | A1 | * | 11/2006 | Saieg et al. | 280/149.2 |
| 2006/0267307 | A1 | * | 11/2006 | Saieg et al. | 280/149.2 |
| 2007/0228686 | A1 |   | 10/2007 | Gerstenslager et al. | |
| 2012/0073530 | A1 | * | 3/2012  | Nitz et al. | 123/90.1 |
| 2013/0071177 | A1 | * | 3/2013  | Wang | 403/167 |

\* cited by examiner

*Primary Examiner* — Daniel P Stodola
*Assistant Examiner* — Matthew R McMahon
(74) *Attorney, Agent, or Firm* — Dureska, Kennedy & Moore, L.L.C.; David P. Dureska; Brent L. Moore

(57) ABSTRACT

A pin assembly for a retractable pin mechanism of a slider box of a heavy-duty vehicle includes a pin guide attached to the slider box. A pin is connected to a retraction mechanism and engages the pin guide. The pin includes an integral inboard and outboard stop. The integral inboard and outboard stops of the pin limit movement of the pin with respect to the pin guide and serve as a positive stop for the pin during retraction and extension of the pin when the retraction mechanism is activated or deactivated by the operator of the vehicle.

4 Claims, 18 Drawing Sheets

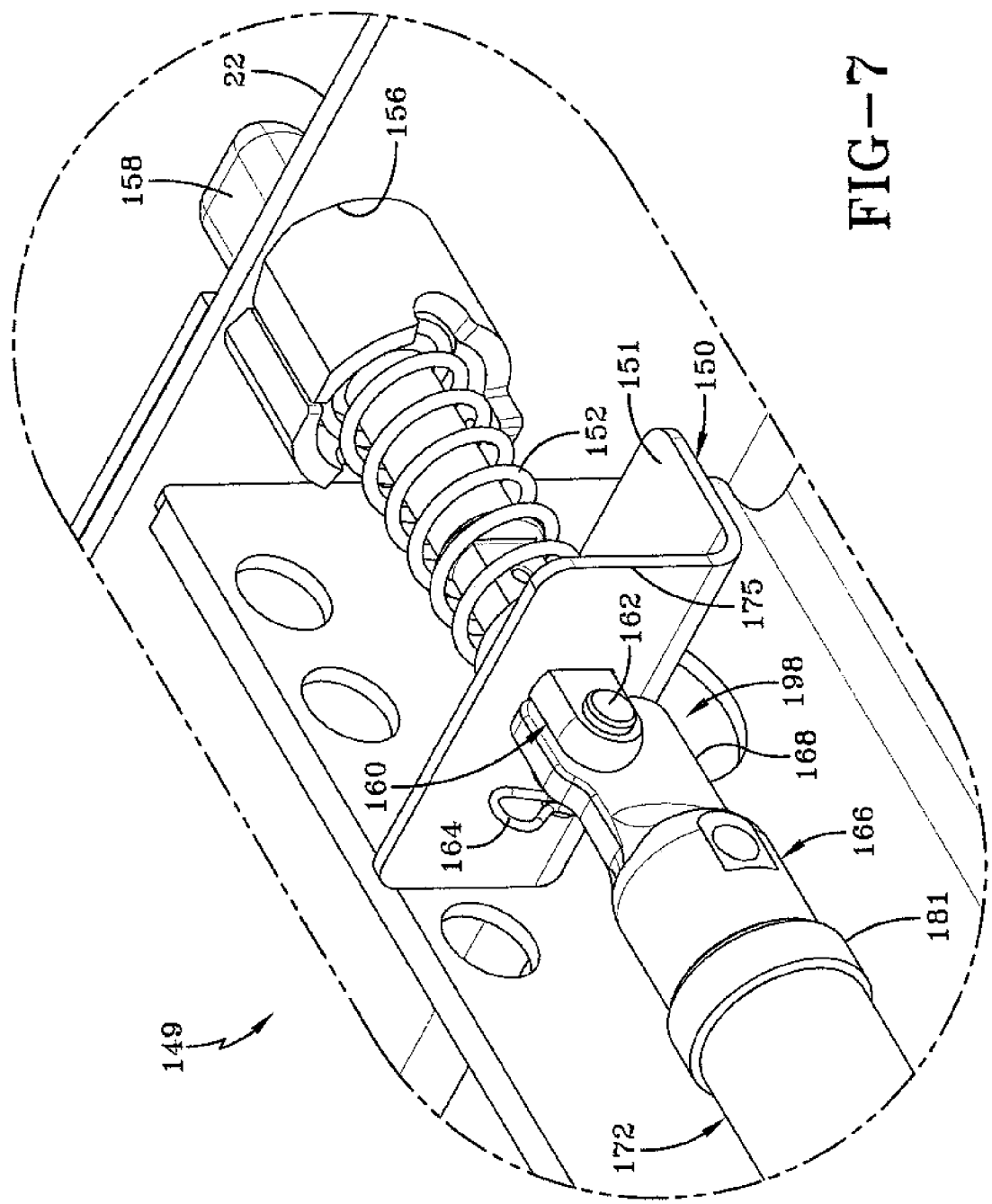

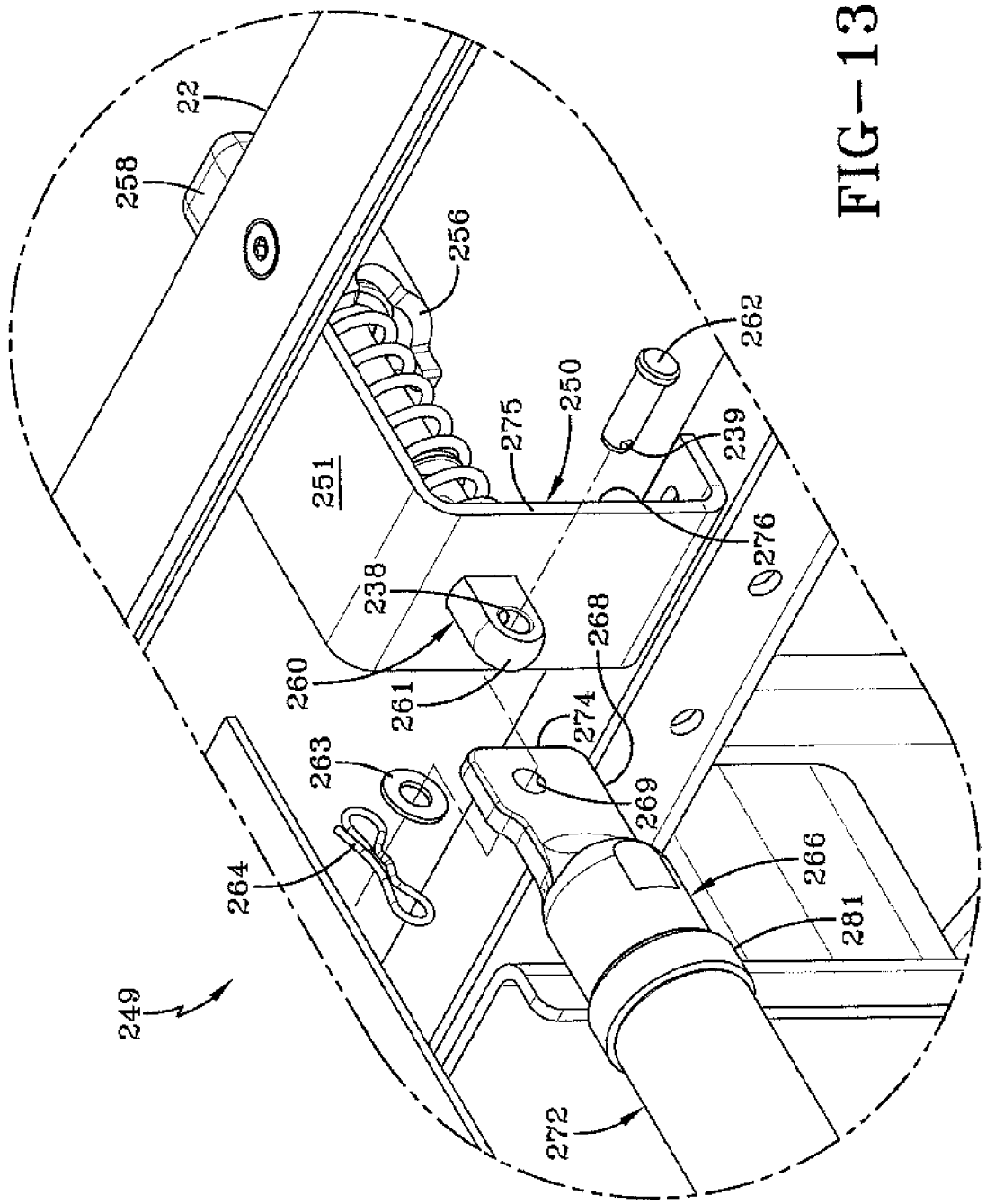

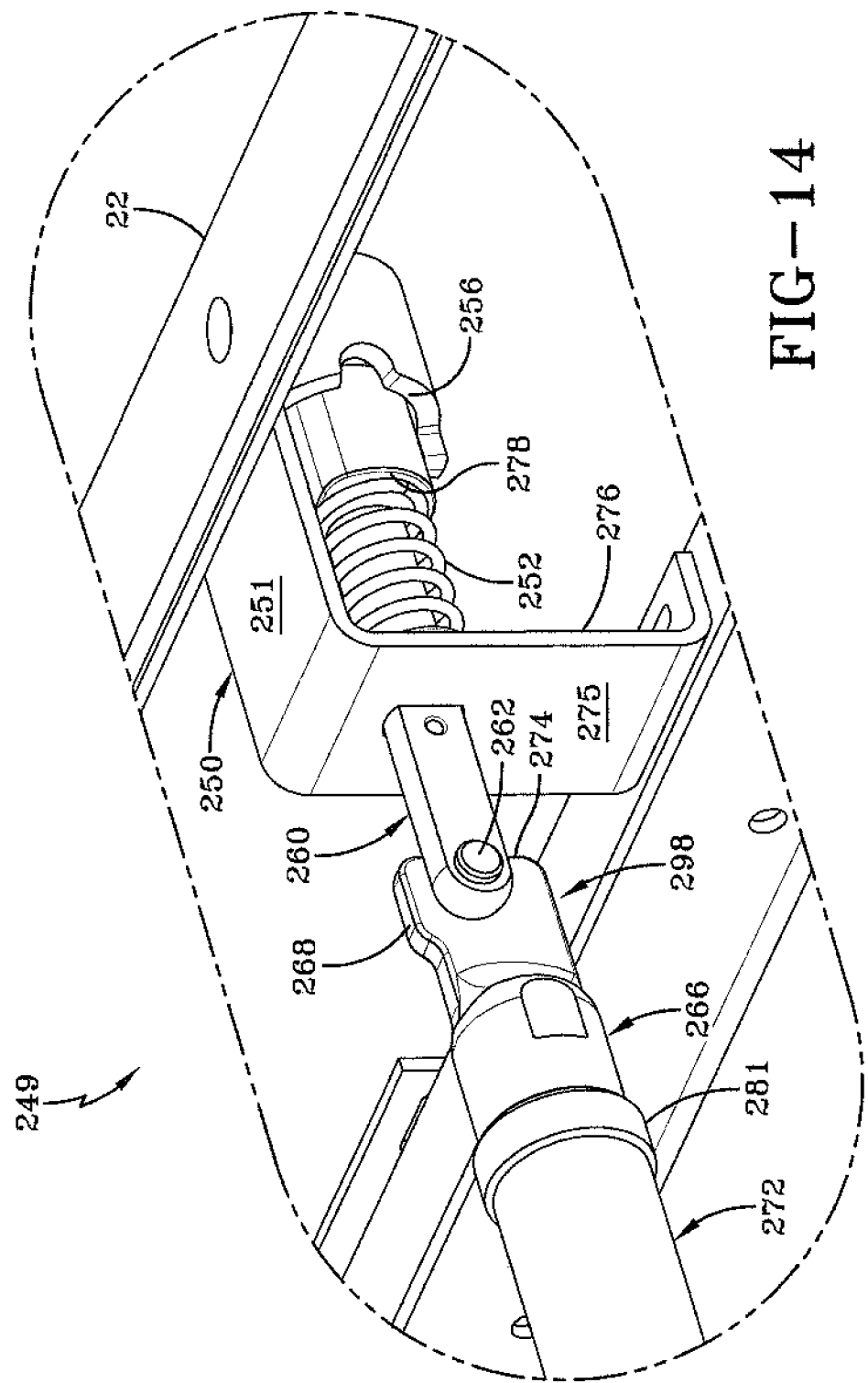

SLIDER PIN ASSEMBLY WITH INTEGRAL INBOARD AND OUTBOARD STOP

CROSS-REFERENCE TO RELATED APPLICATION

This application claims the benefit of U.S. Provisional Patent Application Ser. No. 61/595,721, filed Feb. 7, 2012.

BACKGROUND OF THE INVENTION

1. Field of the Invention

The invention relates generally to subframes for heavy-duty vehicles, such as tractor-trailers, and in particular to movable subframes for tractor-trailers. More particularly, the invention is directed to a movable subframe for tractor-trailers, which includes a pair of main members formed with openings for receiving pins of a retractable pin mechanism, for locking the movable subframe in a selected longitudinal position relative to the tractor-trailer body. Still more particularly, the invention relates to a slider pin assembly for a movable subframe for tractor-trailers in which the slider pin assembly includes integral inboard and outboard stops that eliminate the prior art press-fit stop pin, enables easy installation and repair of the slider pin assembly, reduces weight and material cost of the slider pin assembly, and increases performance, durability and life-span of the slider pin assembly and its components.

2. Background Art

Movable subframes, typically referred to as slider boxes, slider subframes, slider undercarriages, or slider secondary frames, have been utilized on heavy-duty vehicles such as tractor-trailers or semi-trailers for many years. One or more axle/suspension systems usually are suspended from a single slider box. For purposes of clarity, hereinafter the present invention will be referred to as a slider box. It is understood that a slider box outfitted with usually two axle/suspension systems typically is referred to as a slider or slider tandem, and again, for purposes of clarity will hereinafter be referred to as a slider tandem. Of course, as mentioned above, a slider box may also be outfitted with a single axle/suspension system, or three or more axle/suspension systems. Reference herein shall be made to a slider tandem by way of example, with the understanding that such reference applies to a slider outfitted with one, two, three or more axle/suspension systems. The slider tandem in turn is mounted on the underside of the trailer frame, and is movable longitudinally therealong to provide a means for variable load distribution and vehicle maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits.

Once properly positioned, the slider tandem is locked in place on the underside of the trailer by a retractable pin mechanism. The retractable pin mechanism generally includes two or more, and typically four, pin assemblies, which may be interconnected by a crank or other retraction mechanism. When the pins are in their extended position, they each extend through a respective opening formed in the main members of the slider box and a selected aligned one of a plurality of openings formed in rails of the trailer body. The pins thereby lock the slider box in a selected longitudinal position relative to the trailer body.

Prior art pin assemblies typically include a pin body that is connected to the retraction mechanism. The pin body extends through a pin guide that is attached to the slider box frame, which allows transverse movement of the pin body. A spring is disposed about the pin body with the inboard end of the spring biased against the pin guide. The outboard end of the spring is biased against a lip formed in the pin body. The pin outboard end is disposed through a pin collar that is attached to the slider box frame and which is aligned with an opening formed in the main member sidewall. The pin outboard end extends through the pin collar and the aligned main member opening when the slider pin assembly is in an extended state. When the retraction mechanism is operated and the pin is pulled inwardly against the bias of the spring, the pin outboard end is pulled inwardly through the main member opening so that it does not engage the aligned openings in the rails of the trailer body on which the slider box is operatively mounted.

These prior art pin assemblies, although they typically satisfactorily perform their intended function, are heavy. Also, because they retract so that the spring is fully collapsed against its bias, they can be prone to spring fatigue and bell mouthing issues exhibited in the spring. More specifically, because the prior art slider pin assembly completely collapses the spring against its bias and imparts significant force to the fully collapsed spring in the direction of the collapse, the outboard end of the spring can potentially exhibit bell mouthing, or deformation of the spring at its outboard end, as it is forced against the shoulder of the pin body. More particularly, bell mouthing is the increased diameter of the outboard-most coils of the spring that result from a buckling load which can potentially cause the outboard spring coils to be refracted or pushed over adjacent spring coils effectively reducing both the length and the stiffness of the spring. This in turn can compromise the spring's ability to properly bias the pin body into its extended state when the retraction mechanism is deactivated or released by the operator of the vehicle. Moreover, because the stop pin of the prior art slider pin assembly must be press-fit into the pin body opening as described above, the slider pin assembly is difficult to install and remove from the slider box, making field installation and repairs of the slider pin assembly difficult. Additionally, when using a coating process for the slider box, such as galvanizing, the process does not allow the slider pin assembly to be installed prior to welding the slider box together and performing the galvanizing process, and thus installation of the prior art slider pin assembly following the coating process requires significantly more production time.

Therefore, a need exists in the art for a slider pin assembly that overcomes the problems associated with prior art slider pin assemblies. The slider pin assembly of the present invention includes integral inboard and outboard stops that reduce spring fatigue and spring bell-mouthing issues exhibited by prior art slider pin assemblies during operation of the slider pin assembly. Moreover, the slider pin assembly of the present invention is lightweight, reducing the material weight of each slider pin assembly by as much as about 1.14-1.22 lbs. In addition, the slider pin assembly of the present invention reduces material costs and eliminates the press-fit stop pin of prior art slider pin assemblies, which allows easier installation and removal of the slider pin assembly. Thus field installation, removal, maintenance and repair of the slider pin assembly is significantly easier. Additionally, when using a coating process for the slider box, such as galvanizing, that requires the pins to be installed after welding and galvanizing the slider box, installation of the slider pin assembly of the present invention requires significantly less production time than prior art slider pin assemblies. Furthermore, the slider pin assembly of the present invention increases performance, durability and the life span of the slider pin assembly and its components.

SUMMARY OF THE INVENTION

Objectives of the present invention include providing a slider pin assembly that reduces fatigue and bell-mouthing of the spring of the slider pin assembly.

A further objective of the present invention is to provide a slider pin assembly that is lightweight.

Yet another objective of the present invention is to provide a slider pin assembly that reduces material costs and eliminates the need for the press-fit stop pin.

Still another objective of the present invention is to provide a slider pin assembly that is significantly easier to install, remove, maintain and repair in the field.

Another objective of the present invention is to provide a slider pin assembly that can be installed after the slider box has been welded and coated and that requires generally less production time.

A further objective of the present invention is to provide a slider pin assembly that has increased performance, increased durability and an increased life span.

These objectives and advantages are obtained by the pin assembly for a retractable pin mechanism of a slider box of a heavy-duty vehicle comprising: a pin guide attached to the slider box, a pin operatively connected to a retraction mechanism, the pin engaging the pin guide, the pin including an inboard stop and an outboard stop, whereby the inboard stop limits movement of the pin when the pin is retracted and whereby the outboard stop limits movement of the pin when the pin is extended.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

FIG. 7 is a fragmentary top front perspective view of the first preferred embodiment slider pin assembly of the present invention shown in FIG. 5;

FIG. 13 is a view similar to FIG. 10, but showing the pin body and spring of the second preferred embodiment slider pin assembly of the present invention in their respective operating positions, with the connection of the pin to the retraction mechanism shown in exploded view; and FIG. 14 is a view similar to FIG. 10, but showing the slider pin assembly in a retracted state.

Similar numerals refer to similar parts throughout the drawings.

DESCRIPTION OF THE PREFERRED EMBODIMENT

Figure 1:
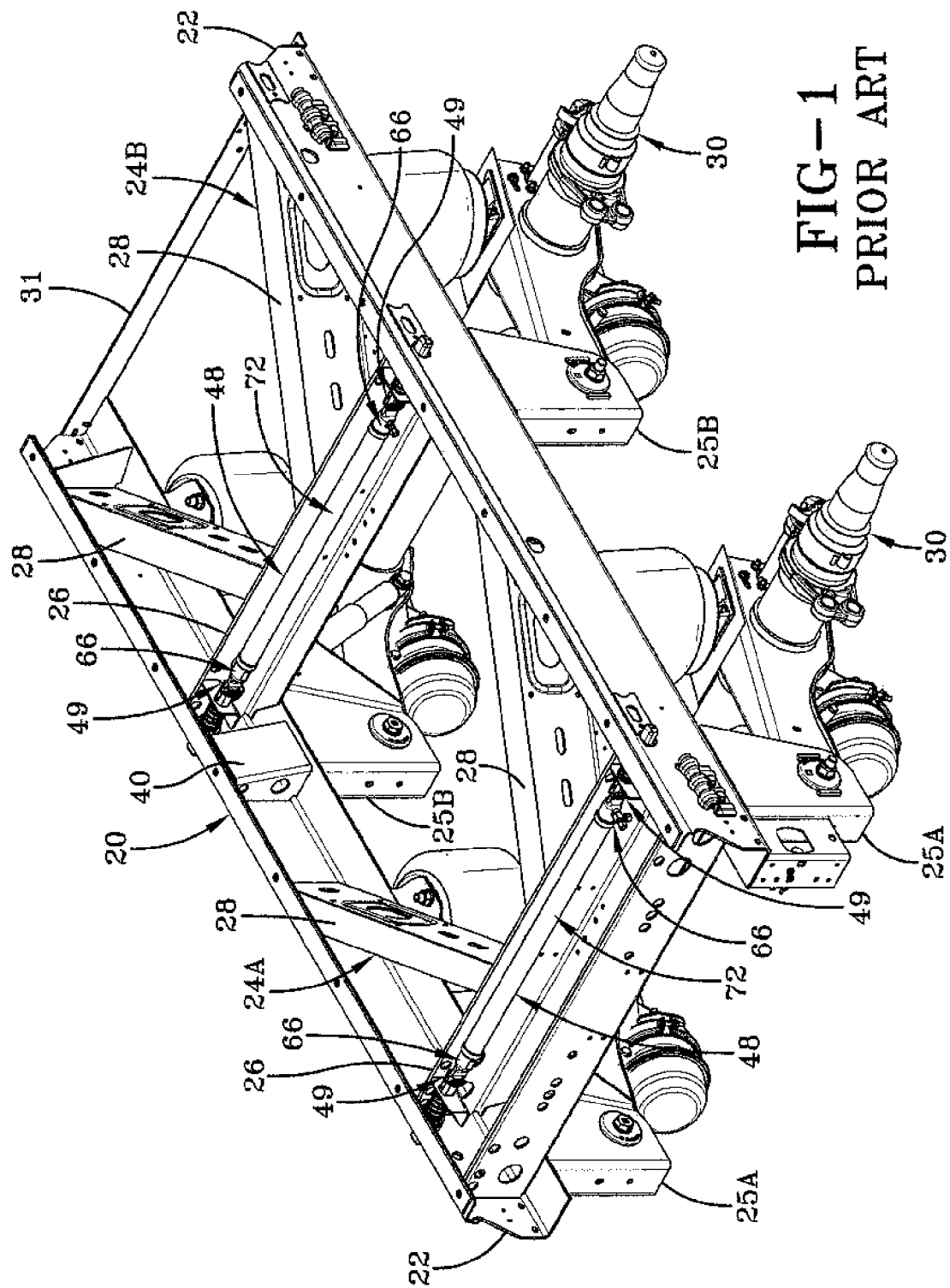
FIG. 1 is a front driver side perspective view of a conventional prior art slider box for a semi-trailer, having a pair of generally K-shaped cross members adjacent front and rear axle/suspension systems, showing the hangers for suspending axle/suspension systems, and further showing retractable pin mechanisms used to selectively locate the slider box along the underside of a trailer.

In order to better understand the environment in which the slider pin assembly of the present invention is utilized, a slider box 20 incorporating prior art slider pin assemblies 49 is shown in FIG. 1 and now will be described in detail below.

Slider box 20 includes a pair of elongated, longitudinally extending, spaced-apart parallel main members 22. Main members 22 are connected to each other by a pair of K-shaped cross members 24A and 24B. K-shaped cross members 24A,B extend between, typically nest in, and are welded to main members 22 to form interconnected rigid slider box structure 20. Front and rear pairs of hangers 25A and 25B, respectively, of slider box 20 suspend tandem axle/suspension systems 30 from main members 22.

More specifically, each main member 22 is a generally C-shaped cross-sectional beam typically made of steel. The open portion of each main member 22 is opposed to the open portion of the other main member and faces inboard in relation to slider box 20. Each K-shaped cross member 24A,B also is formed of steel and includes a base member 26 which extends between and is perpendicular to main members 22, and two inclined or angled cross brace members 28, each of which extend in a generally diagonal manner between a generally central portion of the base member and a respective one of the main members 22, as shown in FIG. 1. Each end of base member 26, and the outboard end of each cross brace 28, nests in the open portion of a respective one of main members 22, and are secured therein by any suitable means such as welding, again creating generally concentrated loadings at the point of attachment as with other similar prior art slider boxes. A pair of steel reinforcement boxes 40 are mounted on main members 22 adjacent to and above rear hangers 25B to provide additional strength to slider box 20 for supporting the hangers and axle/suspension systems 30 pivotally attached thereto. A reinforcement bar 31 is mounted on and extends between the rear ends of main members 22 to provide additional strength to the overall structure of slider box 20. A retractable pin mechanism 48 used for locking slider box 20 in place on a primary frame (not shown) of a vehicle also is shown, but does not form part of the slider box.

More particularly, each retractable pin mechanism 48 includes a pair of slider pin assemblies 49 attached to each end of a retraction mechanism 72. More specifically, retraction mechanism 72 is an inflatable bladder connected at each one of its ends to an end cap 66, which is in turn connected to slider pin assembly 49. With additional reference to FIG. 2, as retraction mechanism 72 is activated by the operator of the heavy-duty vehicle, end caps 66 are pulled inboardly, thus moving a pin body 60 of slider pin assembly 49 out of engagement with an opening 35 of main member 22 of slider box 20. Because each one of slider pin assemblies 49 are generally identical to one another, only one of the slider pin assemblies will be described in detail below with the understanding that a generally identical slider pin assembly is attached to the opposite side of the retraction mechanism.

Figure 2:
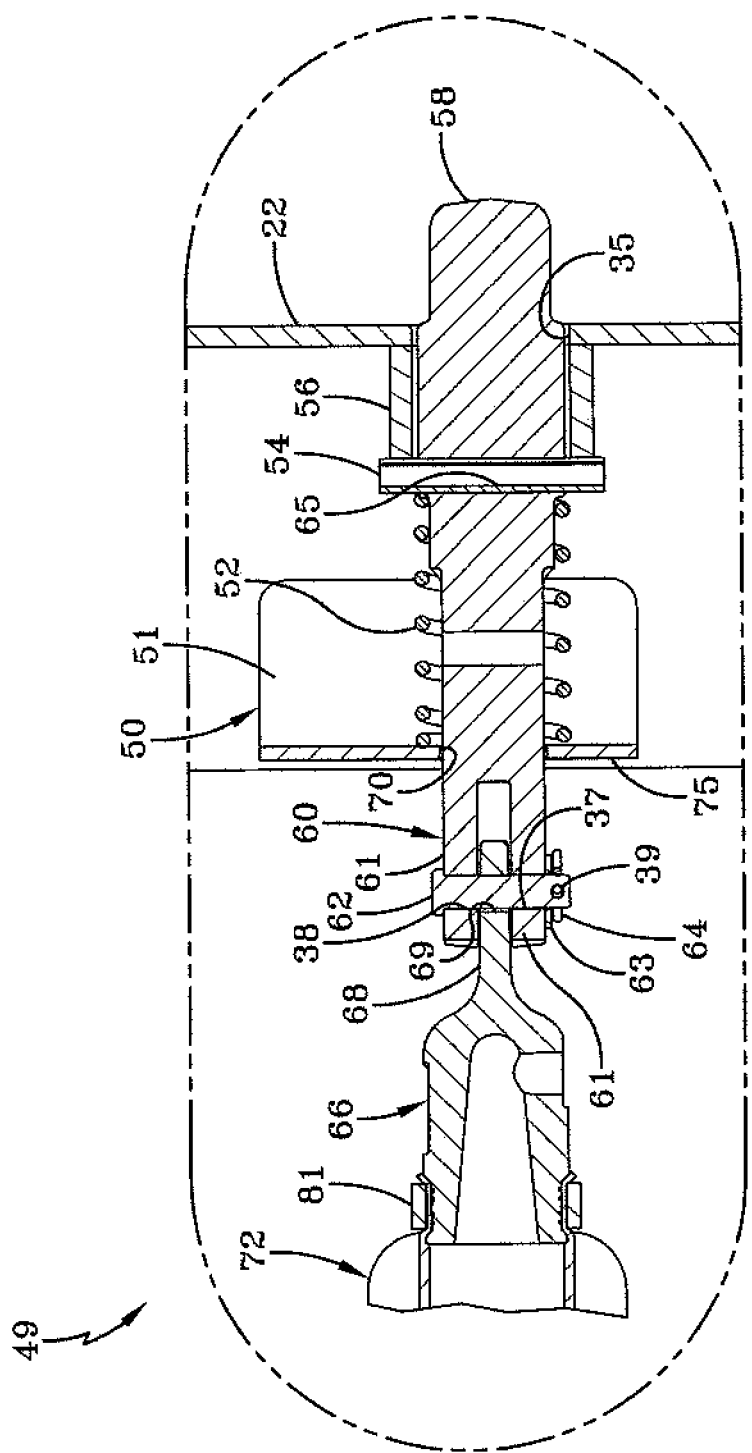
FIG. 2 is a fragmentary top sectional view of one of the prior art slider pin assemblies shown in FIG. 1, showing the pin extended through the opening in the main member sidewall of the slider box.
Figure 2A:
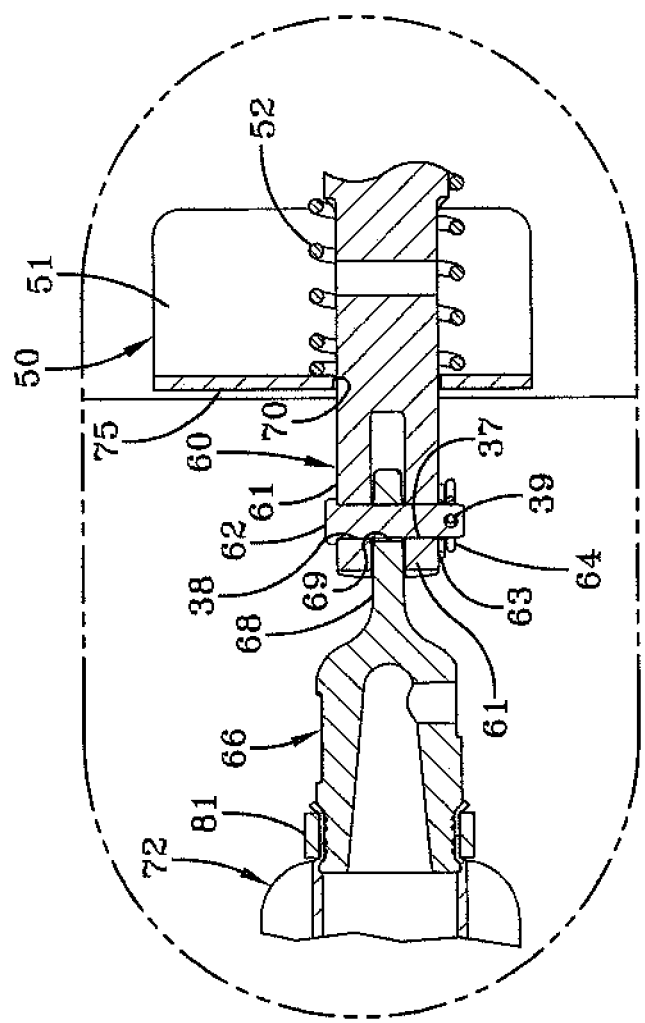
FIG. 2A is an enlarged view similar to FIG. 2.
Figure 3:
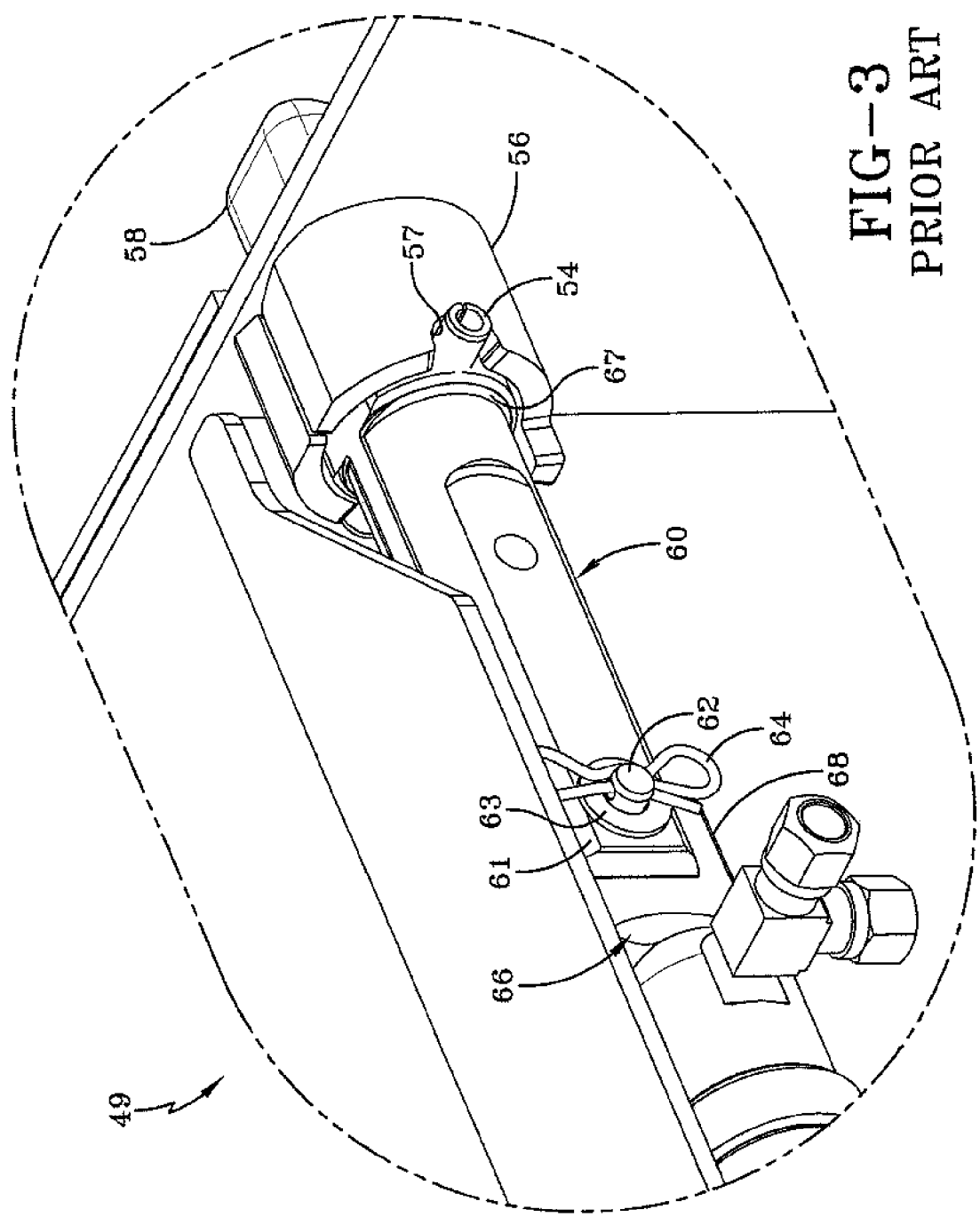
FIG. 3 is a fragmentary top front perspective view of the prior art slider pin assembly shown in FIG. 2, but with the spring and pin guide removed.

With continuing reference to FIG. 2 and with additional reference to FIGS. 2A-4A, prior art slider pin assembly 49 is shown connected to the retraction mechanism 72 in a manner well known in the art. More particularly, retraction mechanism 72 is connected to end cap 66 by a retaining ring 81. End cap 66 is formed from metal or other sturdy material and includes a stem 68 at its outboard end. Stem 68 is formed with a circular transverse opening 69 relative to the longitudinal centerline of the end cap. Stem 68 nests in a forked inboard end 61 of pin body 60 of slider pin assembly 49. Forked end 61 of pin body 60 also is formed with a pair of transverse openings 37,38, relative to the longitudinal centerline of the pin body, that align with one another and that also align with transverse opening 69 formed in stem 68. A fastener 62 is disposed through transverse opening 38 of forked end 61, through transverse opening 69 of stem 68, and through transverse opening 37 of the forked end of the pin body. Fastener 62 is formed with an opening 39 adjacent transverse opening 37. A washer 63 is disposed on fastener 62 between forked end opening 37 and fastener opening 39. An anti-vibration pin 64 is disposed through fastener opening 39 in order to complete assembly of fastener 62, and to connect end cap 66 to slider pin body 60 in a manner well known to those having skill in the art.

Pin body 60 in turn is disposed through an opening 70 formed in a vertical arm 75 of a pin guide 50, which is in turn rigidly attached to slider box 20 in a manner well known to those having skill in the art, such as by welds. Pin guide 50 includes a rectangular base member 51 and generally vertical arm member 75. Pin body 60 is formed with a shoulder 67 (FIG. 3) and a transverse opening 65 (FIG. 2), relative to the longitudinal centerline of the pin body, formed near the outboard end of the pin body. A stop pin 54 is press-fit into pin body opening 65 in a manner well known to those having skill in the art. Stop pin 54 nests in a groove 57 (FIGS. 3 and 4) formed in a pin collar 56 through which pin body 60 is disposed. Pin body 60 includes a pin end 58 at its outboard end having a generally D-shape. Pin end 58 extends through opening 35 formed in main member 22 when retraction mechanism 72 is de-activated or released and slider pin assembly 49 is in an extended state. A spring 52 is disposed about pin body 60, is biased against shoulder 67 at its outboard end, and is biased against pin guide vertical member 75 at its inboard end. As a result, pin body 60 and stop pin 54 are biased into groove 57 of pin collar 56 by spring 52 when retraction mechanism 72 is de-activated or released and slider pin assembly 49 is in an extended state. Having described the structure of prior art slider pin assembly 49 above, the installation of the slider pin assembly will now be described in detail immediately below.

Pin collar 56 is first mounted on main member 22 of slider box 20 so that the pin collar aligns with opening 35 formed in the main member. Stop pin 54 is press fit into opening 65 of pin body 60 using a hydraulic ram. Pin body 60 is placed into pin collar 56 and opening 35. Spring 52 is disposed over pin body forked end 61 and about pin body 60. Pin guide opening 70 is disposed about pin body forked end 61 and the pin guide is attached to slider box 20 in a manner well known to those having skill in the art, such as by welding. End cap stem 68 is disposed into pin body forked end 61 so that openings 37,38 of the forked end of pin body 60 align with opening 69 of the end cap stem. Fastener 62 is disposed through opening 38, through opening 69 and through opening 37. Anti-vibration pin 64 is disposed through opening 39 of fastener 62 to complete installation of slider pin assembly 49.

For certain applications, such as when the slider box is being utilized in conjunction with a coating process, pin guide 50 must be attached to slider box 20 prior to insertion of pin body 60 into pin collar 56 and opening 35 of main member 22. This is the case because if pin body 60 were inserted into pin collar 56 and opening 35 prior to application of the coating, the pin body would fuse with the pin collar and opening, thus making slider pin assembly 49 inoperable. For these coated applications, pin guide 50 and pin collar 56 are attached to slider box 20 in a manner well known in the art, such as by welding. Slider box 20, including pin guide 50 and pin collar 56, are then coated in a manner well known in the art. Spring 52 then is placed between pin guide 50 and pin collar 56 and forked end 61 of pin body 60 is disposed through opening 35, through the pin collar, through the spring and through opening 70 formed in the pin guide. Stop pin 54 is then disposed through opening 65 of pin body 60 on the inboard side of pin collar 56, using a hammer or other similar tool. It should be noted that a hammer or other similar tool is required in this situation because there is insufficient clearance around slider pin assembly 49 to use a hydraulic ram as described above. End cap stem 68 is disposed into pin body forked end 61 so that openings 37,38 of the forked end of pin body 60 align with opening 69 of the end cap stem. Fastener 62 is disposed through opening 38 of forked end 61, through opening 69 of stem 68, through opening 37 of the forked end of pin body 60, and through washer 63. Anti-vibration pin 64 is disposed through opening 39 of fastener 62 to complete installation of slider pin assembly 49. Having now described the installation of prior art slider pin assembly 49 above, the operation of the slider pin assembly now will be described in detail below.

Figure 4:
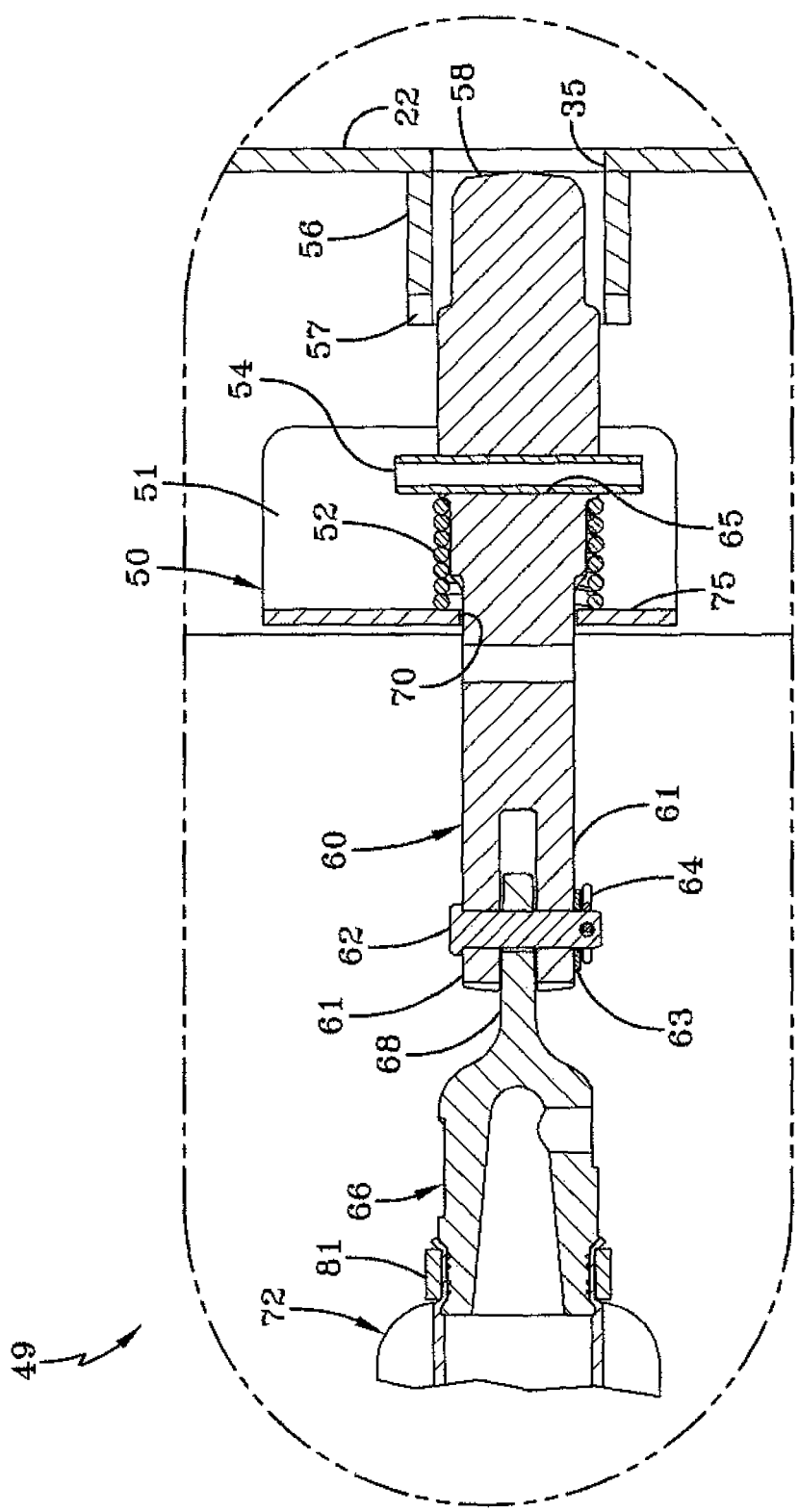
FIG. 4 is a fragmentary top sectional view of the prior art slider pin assembly shown in FIG. 2, but showing the pin retracted out of the opening in the main member of the slider box.
Figure 4A:
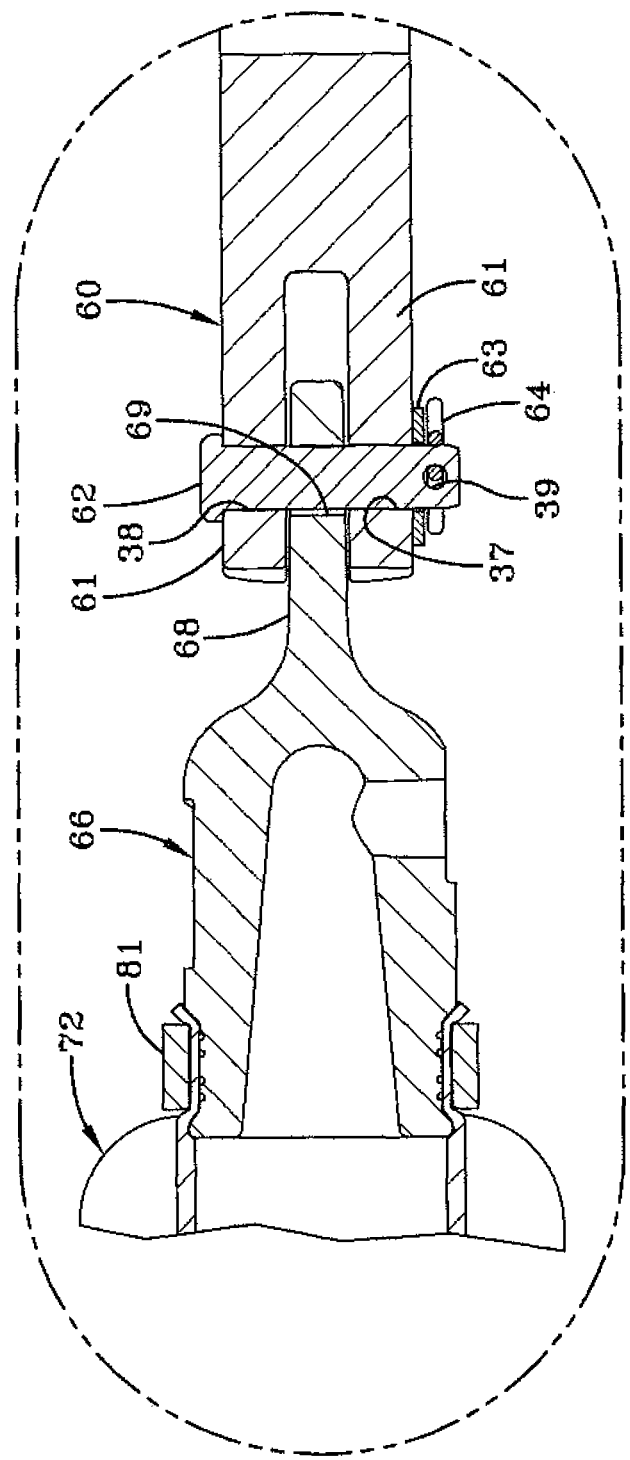
FIG. 4A is an enlarged view similar to FIG. 4.

With particular reference to FIGS. 2 and 4, the operation of prior art slider pin assembly 49 will now be described. Slider pin assembly 49 is shown in its extended state in FIG. 2. In the extended state, retraction mechanism 72 is de-activated and spring 52 is biased against pin body shoulder 67, which in turn pushes pin body 60 outboardly, thereby nesting stop pin 54 into groove 57 of pin collar 56 and extending pin end 58 through opening 35 of main member 22 and through a selected opening in the rail of the trailer body as is known in the art to lock the slider box in place. When retraction mechanism 72 is activated by the operator of the vehicle, the retraction mechanism pulls end cap 66 and in turn pin body 60 inboardly, overcoming the bias of spring 52, as shown in FIG. 4. Spring 52 is completely collapsed and stop pin 54 is pulled inboardly away from groove 57 of pin collar 56. As a result, pin end 58 of pin body 60 is also pulled inboardly through opening 35 of main member 22 of slider box 20 and slider pin assembly 49 is in its retracted state to unlock the slider box for repositioning. When retraction mechanism 72 is de-activated by the operator of the vehicle, spring 52 once again is biased against shoulder 67 of pin body 60 pushing the pin body outboardly so that stop pin 54 engages groove 57 of pin collar 56. As a result, pin end 58 is pushed outboardly through opening 35 of main member 22 of slider box 20 and through a selected aligned opening in the rail of the trailer body to lock the slider box in a selected position beneath the trailer.

Prior art slider pin assembly 49 is heavy and because spring 52 is fully collapsed when the slider pin assembly is in a retracted state, the spring can be prone to fatigue and bell mouthing issues. More specifically, because prior art slider pin assembly 49 completely collapses spring 52 against its bias when the slider pin assembly is in its retracted state, the outboard end of the spring can potentially exhibit bell-mouthing, or deformation of the spring at its outboard end, as it is forced against shoulder 67 of pin body 60. More particularly, bell mouthing is the increased diameter of the outboard-most coils of spring 52 that result from a buckling load, which can potentially cause the outboard spring coils to be retracted or pushed over adjacent spring coils effectively reducing both the length and the stiffness of the spring. This in turn can compromise the spring's ability to properly bias pin body 60 into its extended state when retraction mechanism 72 is de-activated or released by the operator of the vehicle. Likewise, spring 52 fatigue can also compromise the spring's ability to properly bias pin body 60 into its extended state, when the retraction mechanism is de-activated or released by the operator of the vehicle. Moreover, because stop pin 54 of prior art slider pin assembly 49 must be press-fit into pin body opening 65 as described above when the slider pin assembly is installed into the slider subframe, the slider pin assembly is difficult to install and remove from the slider box, making field installation and maintenance and repairs of the slider pin assembly difficult. Additionally, when using a coating process for slider box 20, such as galvanizing, that does not allow slider pin assembly 49 to be installed prior to welding the slider box together, installation of the prior art slider pin assembly requires significantly more production time because stop pins 54 must be press fit into pin body opening 65 using a hammer or other similar tool. The slider pin assembly for heavy-duty vehicles of the present invention overcomes the problems associated with prior art slider pin assembly 49, and will now be described in detail below.

A first preferred embodiment slider pin assembly of the present invention is shown generally at reference numeral 149 in FIGS. 5-6A and will be described in detail below. First preferred embodiment slider pin assembly 149 of the present invention is shown connected to a retraction mechanism 172 in a manner well known in the art. More particularly, retraction mechanism 172 is connected to an end cap 166 by a retaining ring 181. End cap 166 is formed from metal or other sturdy material and includes a stem 168 at its outboard end. Stem 168 is formed with a circular transverse opening 169 (FIG. 5A), relative to the longitudinal centerline of end cap 166. Stem 168 nests alongside an inboard end 161 of a pin body 160 of slider pin assembly 149. Inboard end 161 of pin body 160 is formed with a transverse opening 138, relative to the longitudinal centerline of the pin body that aligns with transverse opening 169 formed in stem 168. A fastener 162 is disposed through a washer 165, through transverse opening 138 of pin body inboard end 161, and through transverse opening 169 of stem 168. Fastener 162 is formed with an opening 139 adjacent opening 169. A washer 163 is disposed on fastener 162 between inboard end opening 138 and fastener opening 139. An anti-vibration pin 164 is disposed through fastener opening 139 in order to complete assembly of fastener 162, and to connect end cap 166 to slider pin body 160. In this manner, end cap 166 and pin body 160 form an integral pin 198.

Pin body 160 is disposed through an opening 170 formed in a vertical arm member 175 of a pin guide 150, which is in turn rigidly attached to the slider box in a manner well known to those having skill in the art, such as by welds. Pin guide 150 includes a rectangular base member 151 and generally vertical arm member 175. Pin body 160 is formed with a shoulder 167 generally in a central portion of the pin body. Shoulder 167 serves as a positive stop against the outboard surface of vertical arm member 175 of pin guide 150 when slider pin assembly 149 is in its retracted state, as will be described in more detail below. Pin body 160 is formed with a generally D-shaped pin end 158 at its outboard end. Pin end 158 is disposed through a pin collar 156. Pin end 158 extends through opening 35 formed in main member 22 when retraction mechanism 172 is de-activated or released and slider pin assembly 149 of the present invention is in an extended state. A spring 152 is disposed about pin body 160, is biased at its outboard end against an outer shoulder 178 of pin body 160, and is biased at its inboard end against an outboard surface 176 of pin guide vertical member 175. As a result, an outboard end 174 of stem 168 of end cap 166 is pulled against an inboard surface 173 of vertical member 175 of pin guide 150 when slider pin assembly is in an extended state (FIGS. 5A and 7).

It should be understood that alternative types of fasteners could be utilized in conjunction with slider pin assembly 149 of the present invention, such as a threaded bolt, a washer and a nut, without changing the overall concept or operation of the present invention Having described the structure of first preferred embodiment slider pin assembly 149 of the present invention, the installation of the slider pin assembly now will be described in detail below.

Figure 8:
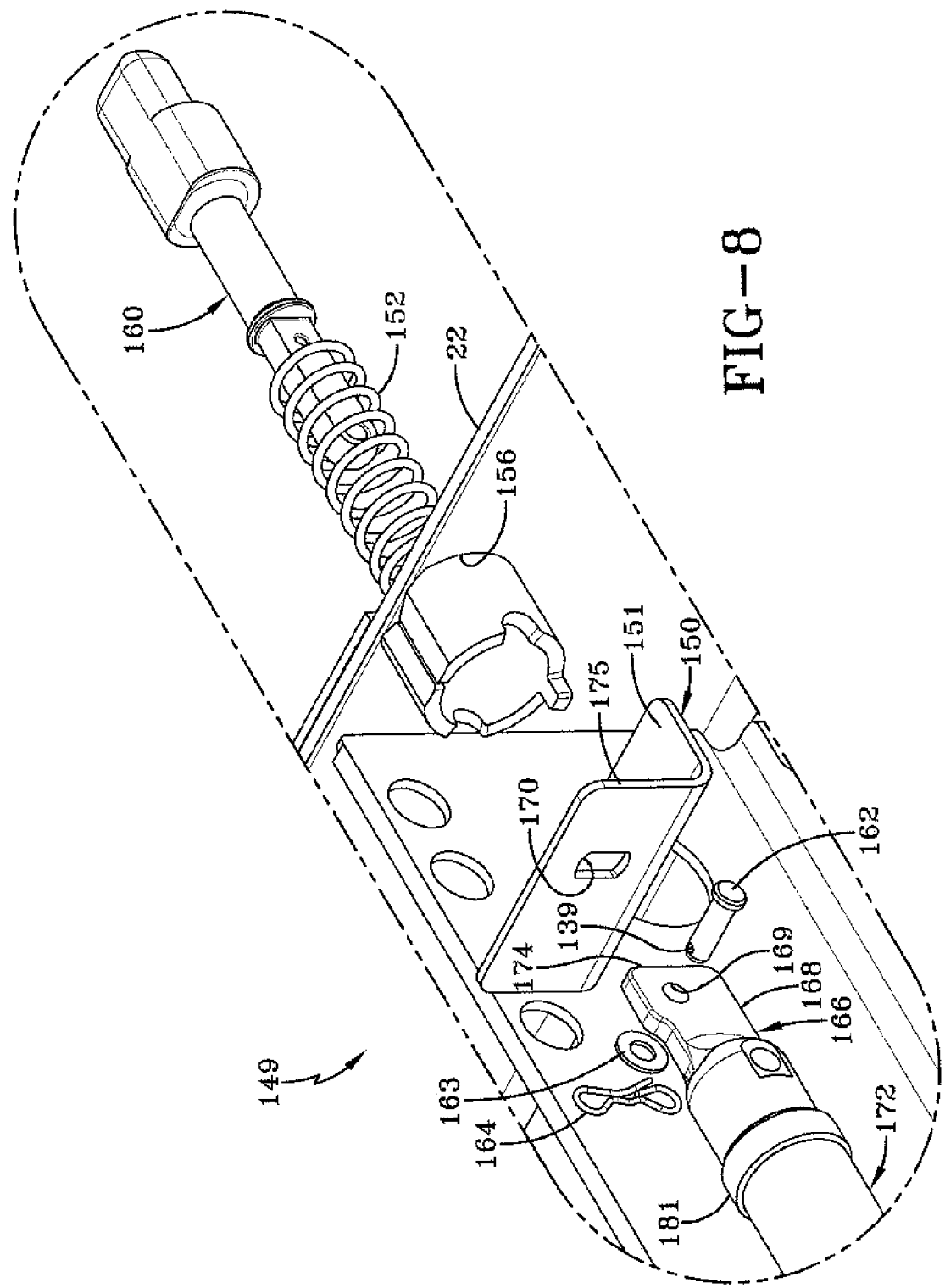
FIG. 8 is a view similar to FIG. 7, but showing the component parts of the first preferred embodiment slider pin assembly of the present invention in exploded view.
Figure 9:
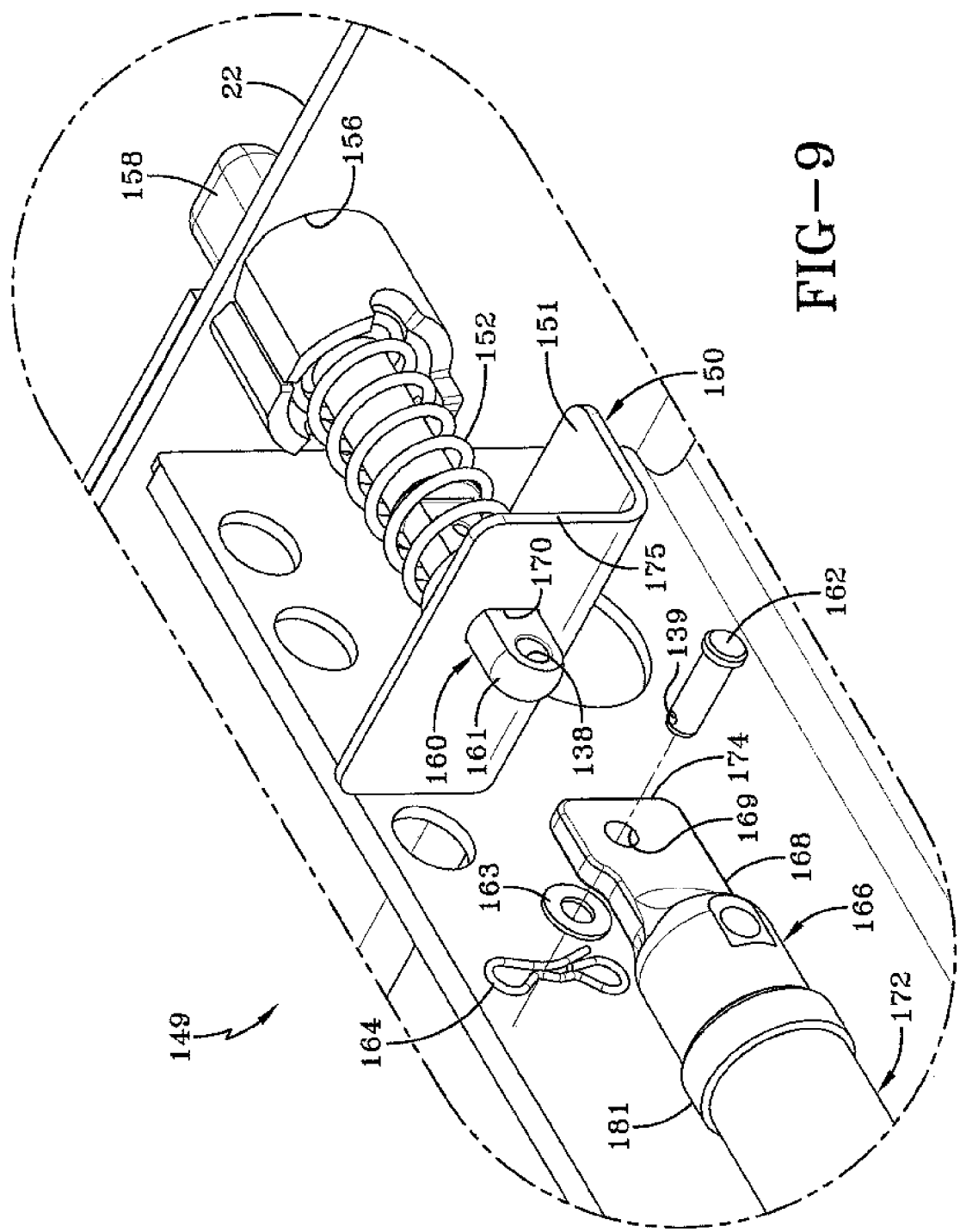
FIG. 9 is a view similar to FIG. 7, but showing the pin body and spring of the first preferred embodiment slider pin assembly of the present invention in their respective operating positions, with the connection of the pin to the retraction mechanism shown in exploded view.

The installation of first preferred embodiment slider pin assembly 149 of the present invention is shown generally in FIGS. 7-9. With particular reference to FIG. 8, pin guide 150 and pin collar 156 are first attached to the slider box by any suitable means such as welds. Pin body 160 is disposed through spring 152 and both are disposed through opening 35 of main member 22 and through pin collar 156 as shown in FIG. 9. Fastener 162 is disposed through opening 138 of pin body 160, through opening 169 formed in stem 168 of end cap 166, and through washer 163. Anti-vibration clip 164 is disposed through fastener opening 139 in order to complete assembly of fastener 162 and to connect end cap 166 to pin body 160 as shown in FIG. 7. Having described the installation of first preferred embodiment slider pin assembly 149 of the present invention, the operation of the slider pin assembly now will be described in detail below.

Figure 5:
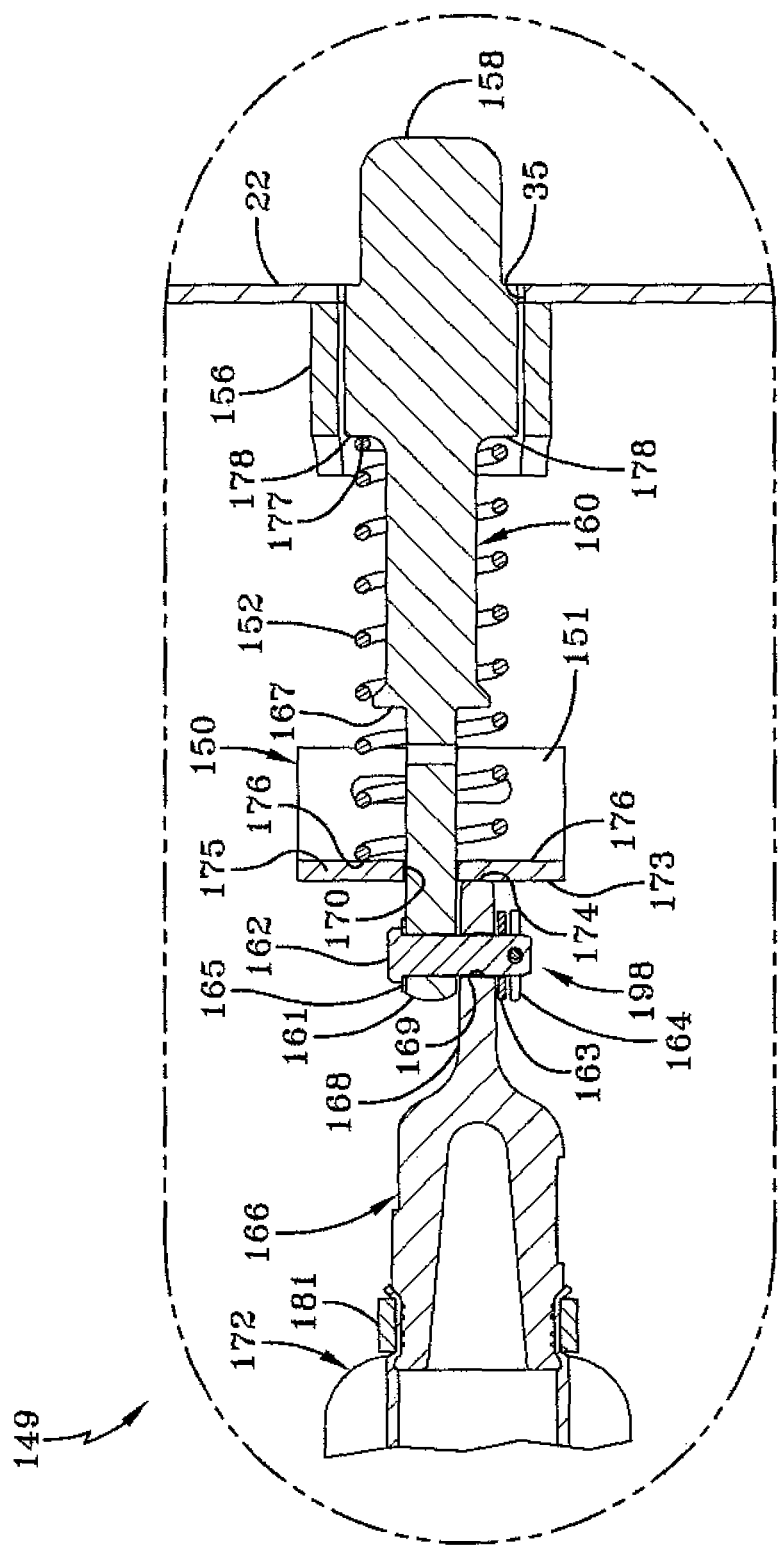
FIG. 5 is a fragmentary top sectional view of a first preferred embodiment slider pin assembly of the present invention, showing the pin end extended through the opening in the main member sidewall of the slider box.
Figure 5A:
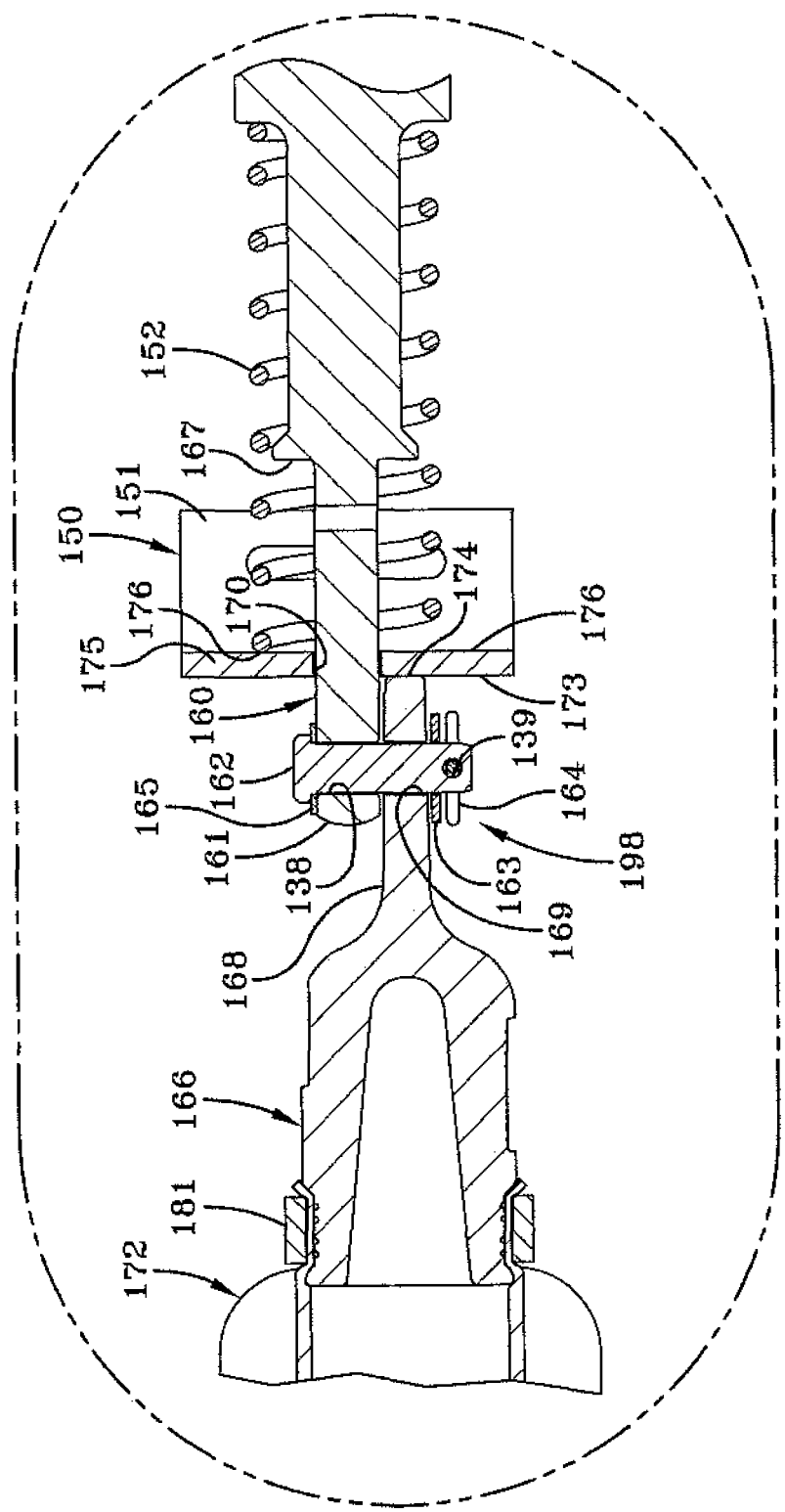
FIG. 5A is an enlarged view similar to FIG. 5.
Figure 6:
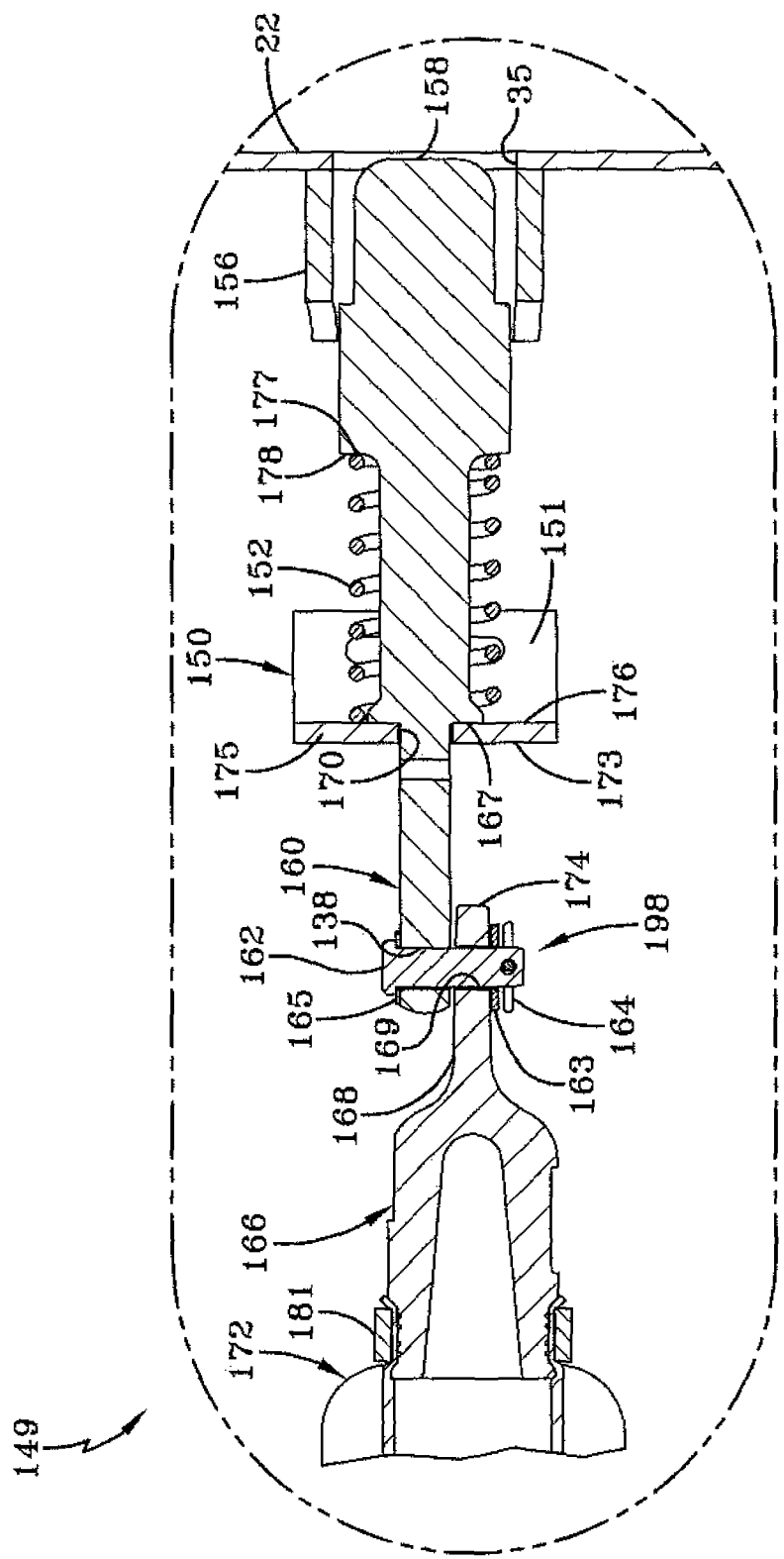
FIG. 6 is a view similar to FIG. 5, but showing the pin end retracted out of the opening in the main member sidewall of the slider box.
Figure 6A:
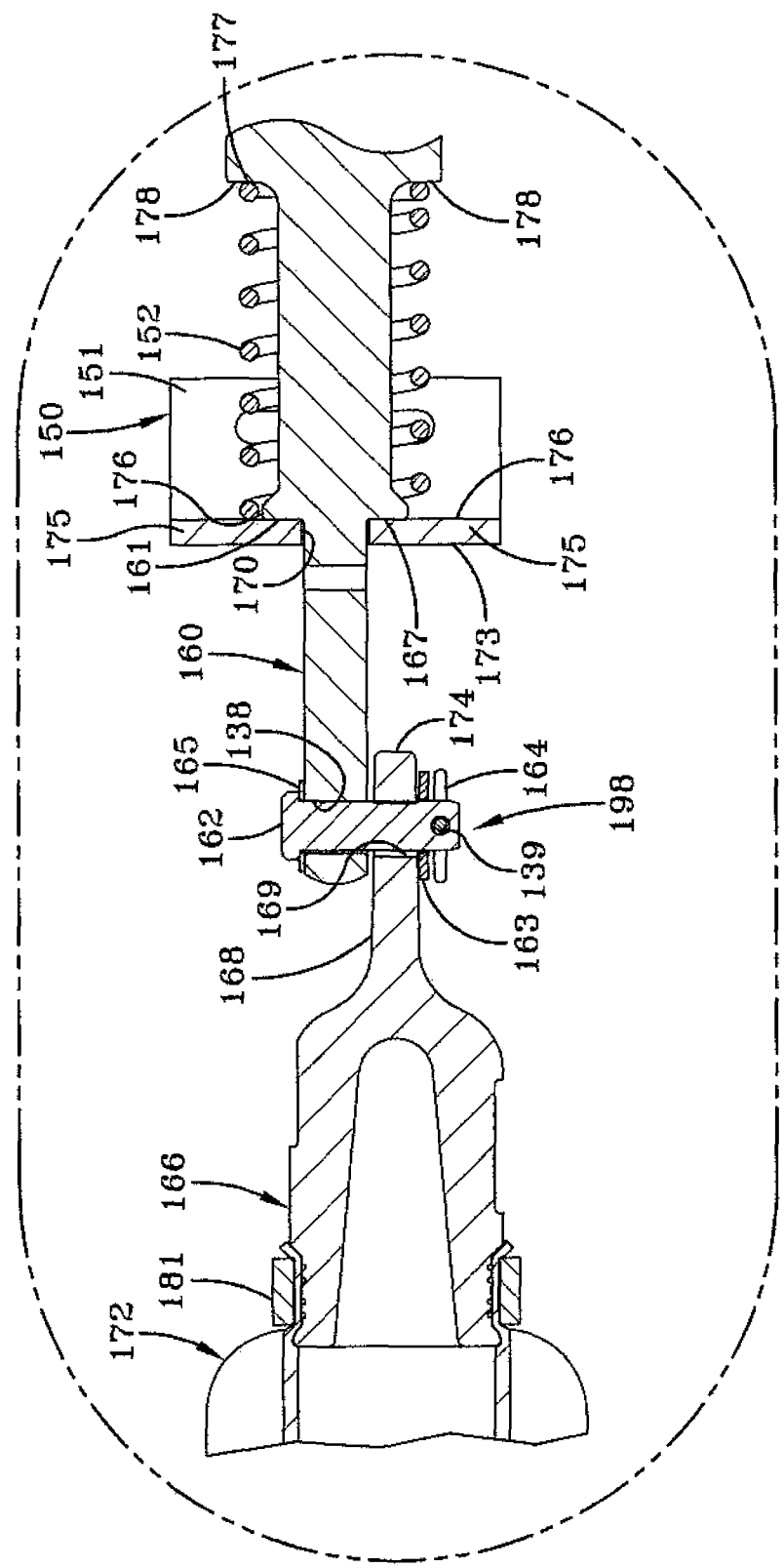
FIG. 6A is an enlarged view similar to FIG. 6.

Turning now to FIGS. 5 and 6, the operation of first preferred embodiment slider pin assembly 149 will now be described. Slider pin assembly 149 is shown in its extended state in FIG. 5. In the extended state, retraction mechanism 172 is de-activated and spring 152 is biased against pin body shoulder 178, which pushes pin body 160 outboardly. More specifically, when retraction mechanism 172 is de-activated by the operator of the heavy-duty vehicle, stem end 174 of end cap 166 is pulled by spring 152 into contact with inboard surface 173 of vertical arm 175 of pin guide 150. The contact of stem end 174 with inboard surface 173 of pin guide vertical arm 175 serves as an integral outboard stop for slider pin assembly 149, limiting further movement of pin body 160 outboardly when slider pin assembly 149 is in an extended state. In the extended state, pin end 158 is extended through opening 35 of main member 22 and through an aligned opening (not shown) formed on the underside of the trailer on which slider box 20 is moveably mounted to selectively lock the slider box in position relative to the trailer. When retraction mechanism 172 is activated by the operator of the heavy-duty vehicle, the retraction mechanism pulls end cap 166, and in turn pin body 160, inboardly, overcoming the bias of spring 152, as shown in FIG. 6. Pin body shoulder 167 in turn contacts outboard surface 176 of vertical arm member 175 of pin guide 150. The contact of shoulder 167 with outboard surface 176 of pin guide vertical arm member 175 serves as an integral inboard stop for slider pin assembly 149, preventing further inboard movement of pin body 160 of the slider pin assembly, when the slider pin assembly is in a retracted state. During retraction of slider pin assembly 149, pin end 158 of pin body 160 is also pulled inboardly through opening 35 of main member 22 of slider box 20 to enable movement of the slider box along the rails of the trailer body for selective repositioning of the slider box. When retraction mechanism 172 is de-activated by the operator of the heavy-duty vehicle, spring 152 once again is biased against shoulder 178 of pin body 60 and stem end 174 of end cap 166 is pulled by the spring into contact with inboard surface 173 of vertical arm 175 of pin guide 150. As a result, pin end 158 is moved outboardly and extends through opening 35 of main member 22 of slider box 20 and through an aligned opening (not shown) formed in the rail of the trailer body to lock the slider box in place beneath the trailer.

A second preferred embodiment slider pin assembly of the present invention is shown generally at reference numeral 249 in FIGS. 10-14 and now will be described in detail below. Second preferred embodiment slider pin assembly 249 is similar in many respects to first preferred embodiment slider pin assembly 149 of the present invention, with the primary difference being the orientation of a pin guide 250. Second preferred embodiment slider pin assembly 249 of the present invention is shown connected to a retraction mechanism 272 in a manner well known in the art. More particularly and with particular reference to FIGS. 10 and 11, retraction mechanism 272 is connected to an end cap 266 by a retaining ring 281. End cap 266 is formed from metal or other sturdy material and includes a stem 268 at its outboard end. Stem 268 is formed with a circular transverse opening 269, relative to the longitudinal centerline of end cap 266. Stem 268 nests alongside an inboard end 261 of a pin body 260 of slider pin assembly 249. Inboard end 261 of pin body 260 is formed with a transverse opening 238, relative to the longitudinal centerline of the pin body that aligns with transverse opening 269 formed in stem 268. A fastener 262 is disposed through transverse opening 238 of inboard end 261 and through transverse opening 269 of stem 268. A washer 263 is disposed on fastener 262. An anti-vibration clip 264 is disposed through a fastener opening 239 in order to complete assembly of fastener 262 and to connect end cap 266 to slider pin body 260. In this manner, end cap 266 and pin body 260 form an integral pin 298. Pin body 260 is disposed through an opening 270 formed in a vertical arm member 275 of pin guide 250, which is in turn rigidly attached to the slider box in a manner well known to those having skill in the art, such as by welds. As mentioned above, the configuration of pin guide 250 of second preferred embodiment slider pin assembly 249 of the present invention is different from the configuration of pin guide 150 for first preferred embodiment slider pin assembly 149 of the present invention. More specifically, pin guide 250 includes a rectangular top member 251 connected to generally vertical arm member 275. Pin body 260 is formed with a shoulder 267 generally in a central portion of the pin body. Shoulder 267 serves as a positive stop against an outboard surface 276 of vertical arm member 275 of pin guide 250, when slider pin assembly 249 is in its retracted state, as will be described in more detail below. Pin body 260 is formed with a generally D-shaped pin end 258 at its outboard end. Pin end 258 is disposed through a pin collar 256. Pin end 258 extends through opening 35 formed in main member 22 of slider box 20 when retraction mechanism 272 is de-activated or released and slider pin assembly 249 of the present invention is in an extended state. A spring 252 is disposed about pin body 260, is biased at its outboard end against an outer shoulder 278 of pin body 260, and is biased at its inboard end against outboard surface 276 of pin guide vertical member 275. As a result, an outboard end 274 of end cap stem 268 is pulled against an inboard surface 273 of vertical member 275 of pin guide 250, when slider pin assembly is in an extended state. Having described the structure of first preferred embodiment slider pin assembly 249 of the present invention, the installation of the slider pin assembly now will be described in detail below.

Figure 10:
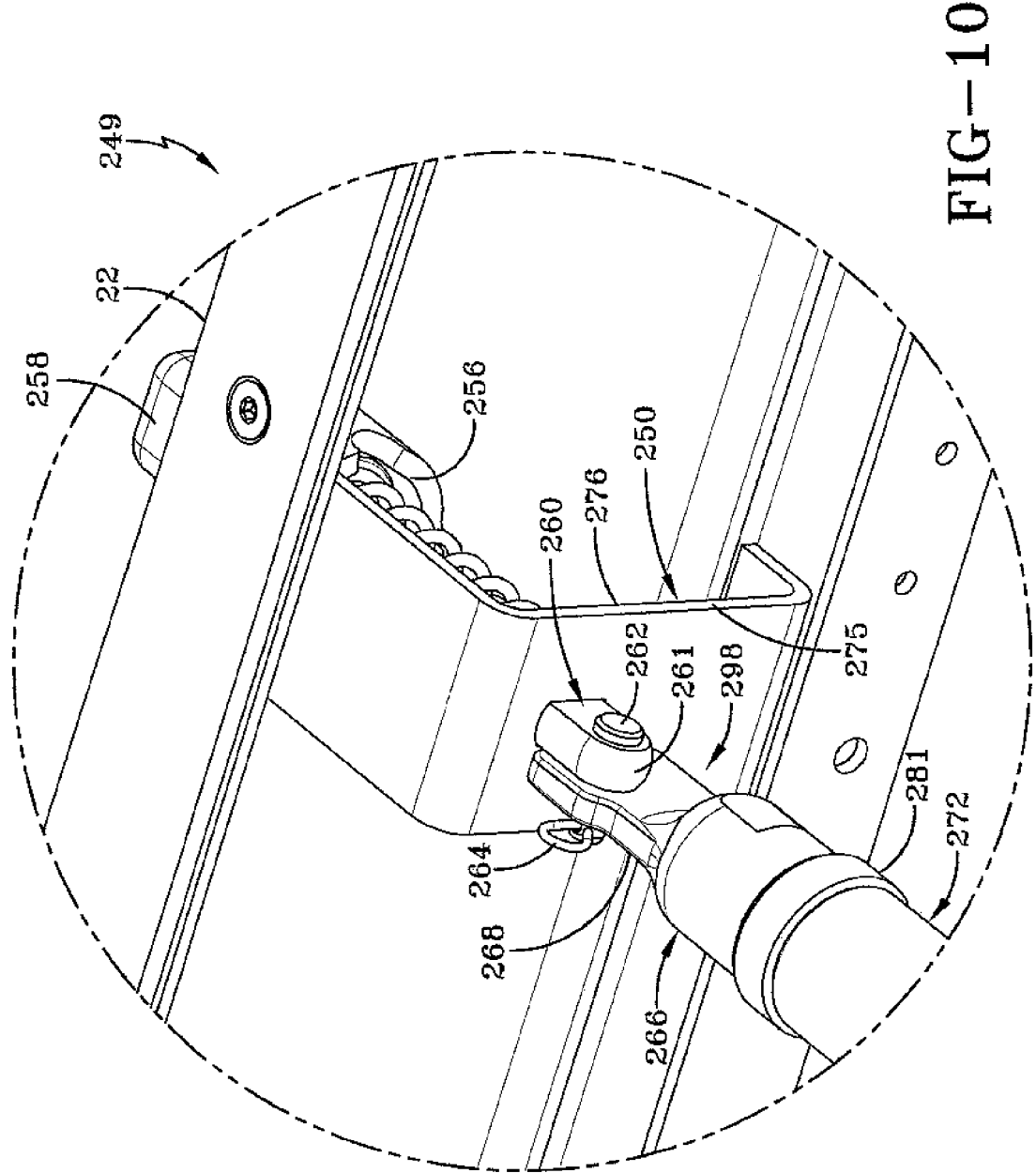
FIG. 10 is a fragmentary top front perspective view of a second preferred embodiment slider pin assembly of the present invention, showing the pin end extended through the main member sidewall of the slider box and also showing the inboard end of the pin body extending through the pin guide.
Figure 11:
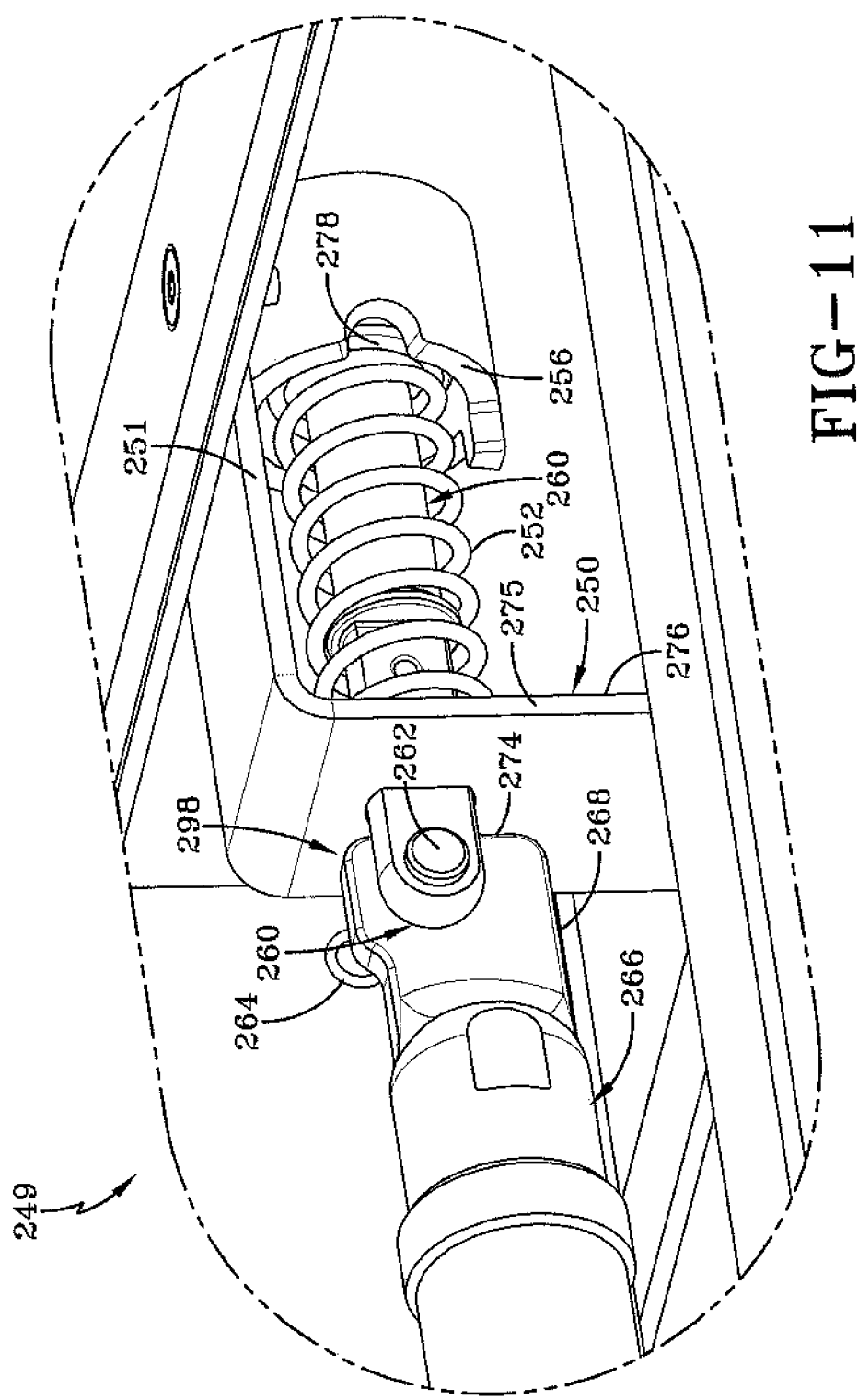
FIG. 11 is an enlarged view similar to FIG. 10.
Figure 12:
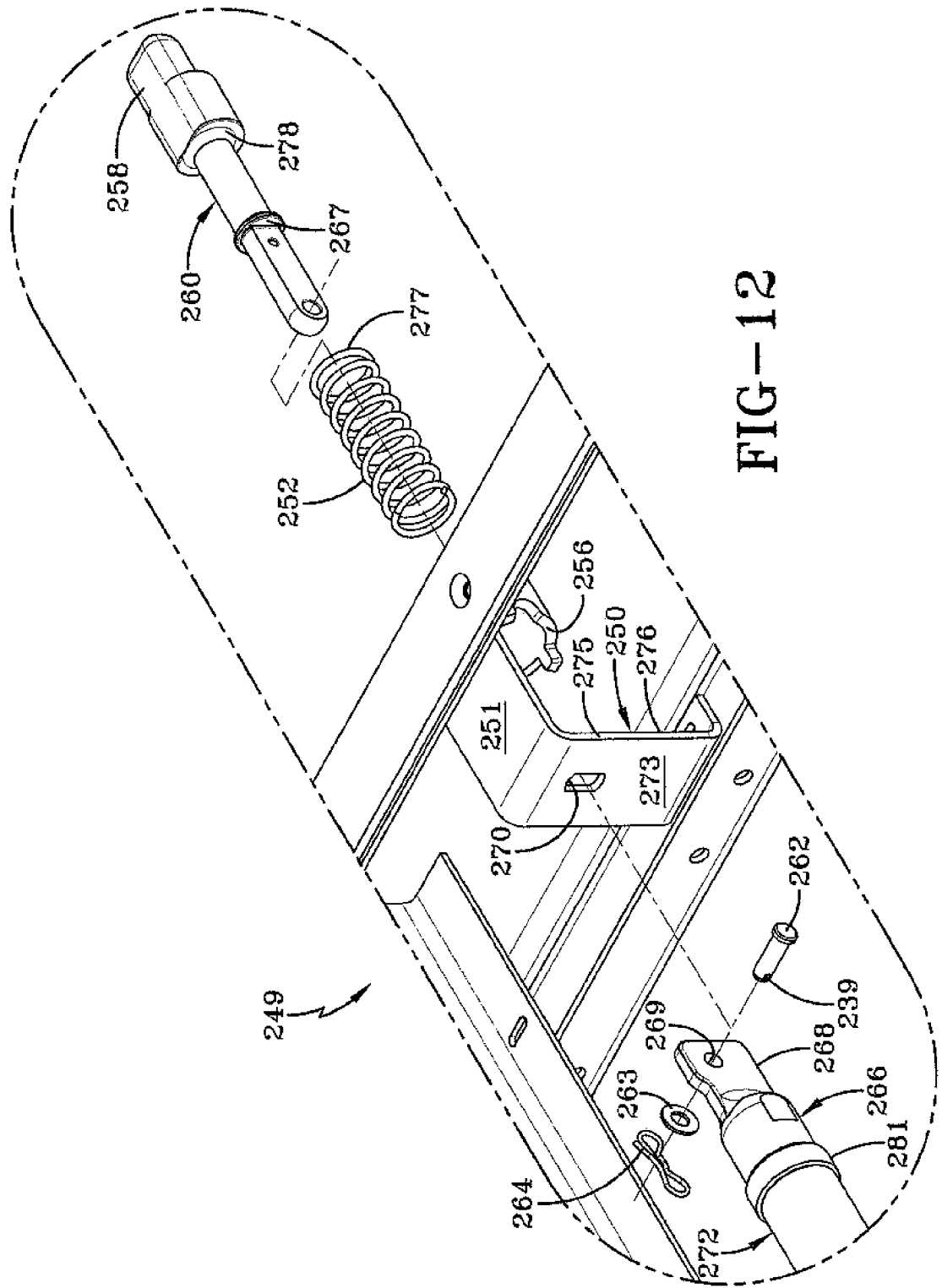
FIG. 12 is a view similar to FIG. 10, but showing the components of the second preferred embodiment slider pin assembly of the present invention in exploded view.

The installation of second preferred embodiment slider pin assembly 249 of the present invention is shown generally in FIGS. 12 and 13. With particular reference to FIG. 12, pin guide 250 and pin collar 256 are first attached to the slider box by any suitable means such as welds. Pin body 260 is disposed through spring 252 and both are disposed through opening 35 of main member 22 of slider box 20 and through pin collar 256 as shown in FIG. 13. Fastener 262 is disposed through opening 238 of inboard end 261 of pin body 260, through opening 269 formed in stem 268 of end cap 266, and through washer 263. Anti-vibration clip 264 is disposed through fastener opening 239 in order to complete assembly of fastener 262 and to connect end cap 266 to pin body 260 as shown in FIG. 10. Having described the installation of second preferred embodiment slider pin assembly 249 of the present invention, the operation of the slider pin assembly now will be described in detail below.

Second preferred embodiment slider pin assembly 249 is shown in its extended state in FIG. 10. In the extended state, retraction mechanism 272 is de-activated and spring 252 is biased against pin body shoulder 278, which pushes pin body 260 outboardly. More specifically, when retraction mechanism 272 is de-activated by the operator of the heavy-duty vehicle, stem end 274 of end cap 266 is pulled by spring 252 into contact with inboard surface 273 of vertical arm 275 of pin guide 250. The contact of stem end 274 with inboard surface 273 of pin guide vertical arm 275 serves as an integral outboard stop for slider pin assembly 249, limiting further movement of pin body 260 outboardly when slider pin assembly 249 is in an extended state. In the extended state, pin end 258 is extended through opening 35 of main member 22 and through an aligned opening (not shown) formed on the underside of the trailer on which slider box 20 is moveably mounted to selectively lock the slider box in position relative to the trailer. When retraction mechanism 272 is activated by the operator of the heavy-duty vehicle, the retraction mechanism pulls end cap 266 and in turn pin body 260 inboardly, overcoming the bias of spring 252, as shown in FIG. 14. Pin body shoulder 267 in turn contacts outboard surface 276 of vertical arm member 275 of pin guide 250. The contact of shoulder 267 with outboard surface 276 of pin guide vertical arm member 275 serves as an integral inboard stop for slider pin assembly 249, preventing further inboard movement of pin body 260 of the slider pin assembly when the slider pin assembly is in a retracted state. During retraction of slider pin assembly 249, pin end 258 of pin body 260 is also pulled inboardly through opening 35 of main member 22 of slider box 20 to enable movement of the slider box along the rails of the trailer body for selectively repositioning the slider box beneath the trailer. When retraction mechanism 272 is deactivated by the operator of the heavy-duty vehicle, spring 252 once again is biased against shoulder 278 of pin body 260 and stem end 274 of end cap 266 is pulled by the spring into contact with inboard surface 273 of vertical arm 275 of pin guide 250. As a result, pin end 258 is moved outboardly and extends through opening 35 of main member 22 of slider box 20 and through an aligned opening (not shown) formed in the rail of the trailer body to lock the slider box in place.

First and second preferred embodiment slider pin assemblies 149,249 of the present invention are lightweight and provide integral inboard and outboard stops for the slider pin assemblies that prevent fatigue of springs 152,252 and eliminate bell mouthing issues of the springs by preventing full collapse of the spring when the slider pin assemblies are in a retracted state. Moreover, first and second preferred embodiment slider pin assemblies 149,249 of the present invention reduce material weight of the slider pin assembly by as much as about 1.14-1.22 lbs. In addition, first and second preferred embodiment slider pin assemblies 149,249 of the present invention reduce material costs by eliminating press-fit stop pin 54 utilized in prior art slider pin assembly 49 and by eliminating material along the length of pin body 160,260. Elimination of stop pin 54 also allows easier installation and removal of first and second preferred embodiment slider pin assemblies 149,249 of the present invention, making field installation, removal, maintenance and repair of the slider pin assemblies significantly easier. Additionally, when using a coating process for the slider box, such as galvanizing, that does not allow the pins to be installed prior to welding and galvanizing the slider box, assembly of first and second preferred embodiment slider pin assemblies 149,249 of the present invention requires significantly less production time than prior art pin assemblies, such as prior art slider pin assembly 49 described above. Furthermore, first and second preferred embodiment slider pin assemblies 149,249 of the present invention increase performance, durability and the life span of the slider pin assembly and its components.

It is contemplated that first and second preferred embodiment slider pin assemblies 149,249 of the present invention could be utilized on tractor-trailers or heavy-duty vehicles having one or more than one axle, and consequently one or more than one axle/suspension system, without changing the overall concept or operation of the present invention. It is further contemplated that first and second preferred embodiment slider pin assemblies 149,249 of the present invention could be utilized on all types of vehicle having subframes which are moveable, without changing the overall concept of the present invention. It is yet even further contemplated that first and second preferred embodiment slider pin assemblies 149,249 of the present invention could be utilized in conjunction with all types of air-ride leading and/or trailing arm beam-type axle/suspension system designs known to those skilled in the art without changing the overall concept or operation of the present invention. For example, the present invention finds application with beams or arms that are made of materials other than steel, such as aluminum, other metals, metal alloys, composites, and/or combinations thereof. It is also contemplated that first and second preferred embodiment slider pin assemblies 149,249 of the present invention could be utilized in conjunction with axle/suspension systems having either an overslung/top-mount configuration or an underslung/bottom-mount configuration, without changing the overall concept or operation of the present invention. The present invention also finds application in beams or arms with different designs and/or configurations than that shown above, such as solid beams, shell-type beams, truss structures, intersecting plates, spring beams and parallel plates. It is also contemplated that first and second preferred embodiment slider pin assemblies 149,249 of the present invention could be utilized in conjunction with other types of air-ride rigid beam-type axle/suspension systems such as those using U-bolts, U-bolt brackets/axle seats and the like, without changing the overall concept or operation of the present invention. It is also contemplated that first and second preferred embodiment slider pin assemblies 149,249 of the present invention could be utilized with different types of retraction mechanisms, such as a manual pin retraction mechanism consisting of a crank that is rotated by a handle connected by links to the slider pin assemblies, or by a pin retraction mechanism that is actuated by a brake chamber that tightens a cable connected between the opposed slider pin assemblies, without changing the overall concept or operation of the present invention. It is also contemplated that first and second preferred embodiment slider pin assemblies 149, 249 of the present invention could be formed from various materials, including but not limited to composites, metal and the like, without changing the overall concept or operation of the present invention. It is also contemplated that first and second preferred embodiment slider pin assemblies 149,249 of the present invention could be used with different types, shapes and configurations of fasteners and fastener openings, without changing the overall concept or operation of the present invention. It is even further contemplated that first and second preferred embodiment slider pin assemblies 149,249 of the present invention could utilize other arrangements of fasteners in order to mount the slider pin to the retraction mechanism, without changing the overall concept or operation of the present invention. It is yet even further contemplated that first and second preferred embodiment slider pin assemblies 149,249 of the present invention could be utilized with pin guides 150,250 having different shapes sizes and configurations, without changing the overall concept or operation of the present invention. It is also contemplated that components of the first and second preferred embodiment slider pin assemblies 149,249 of the present invention could be different shapes, sizes and configurations, without changing the overall concept or operation of the present invention. It is contemplated that certain components of first and second preferred embodiment slider pin assemblies 149,249 of the present invention could be a made from one or more than one piece, without changing the overall concept or operation of the present invention. It is also contemplated that the integral inboard and outboard stops of first and second preferred embodiment slider pin assemblies 149,249 of the present invention could be formed from a single piece of material, without changing the overall concept or operation of the present invention. It is even further contemplated that integral pins 198,298 of slider pin assemblies 149, 249, respectively, could be formed from a single piece of material without changing the overall concept or operation of the present invention.

Accordingly, the slider pin assembly of the present invention is simplified, provides an effective, safe, inexpensive and efficient structure and method which achieves all the enumerated objectives, provides for eliminating difficulties encountered with prior art slider pin assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the slider pin assembly is installed and used, the characteristics of the construction, arrangement and method steps, and the advantageous, new and useful results obtained; the new and useful structures, devices, elements, arrangements, process, parts and combinations are set forth in the appended claims.

What is claimed is:

1. A pin assembly for a retractable pin mechanism of a slider box of a heavy-duty vehicle comprising:

a pin guide formed with an opening and inboard and outboard surfaces, and configured to be attached to said slider box, a pin body operatively connected to a retraction mechanism, said pin body extending through said pin guide opening, the pin body being formed in one-piece and including an inboard stop comprising a shoulder, said pin assembly including an outboard stop, whereby said inboard stop limits inboard movement of said pin body by contacting said pin guide outboard surface when the pin body is moved to a retracted inboard position and the bias of a spring of the pin assembly is overcome, so that said pin assembly spring is not fully compressed, and whereby said outboard stop limits outboard movement of said pin body by contacting said pin guide inboard surface when the pin body is biased to an extended outboard position by the pin assembly spring.

2. A pin assembly for a retractable pin mechanism of claim 1, said outboard stop comprising a stem fastened to said pin body.

3. A pin assembly for a retractable pin mechanism of claim 1, said pin body further comprising a pin end having a generally D-shape.

4. A pin assembly for a retractable pin mechanism of claim 1, wherein said retraction mechanism is an inflatable bladder.

* * * * *